J. H. WEBER.
AUTOMOBILE DIRECTION INDICATOR.
APPLICATION FILED OCT. 24, 1921.
1,432,000.
Patented Oct. 17, 1922.
2 SHEETS—SHEET 1.
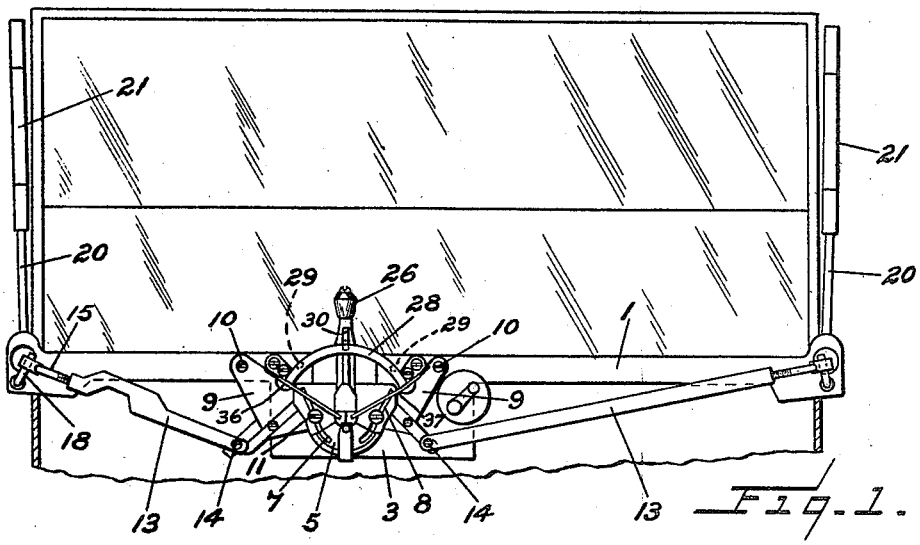
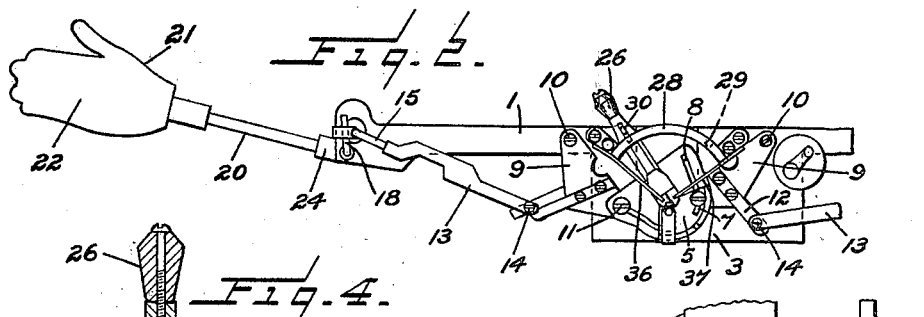
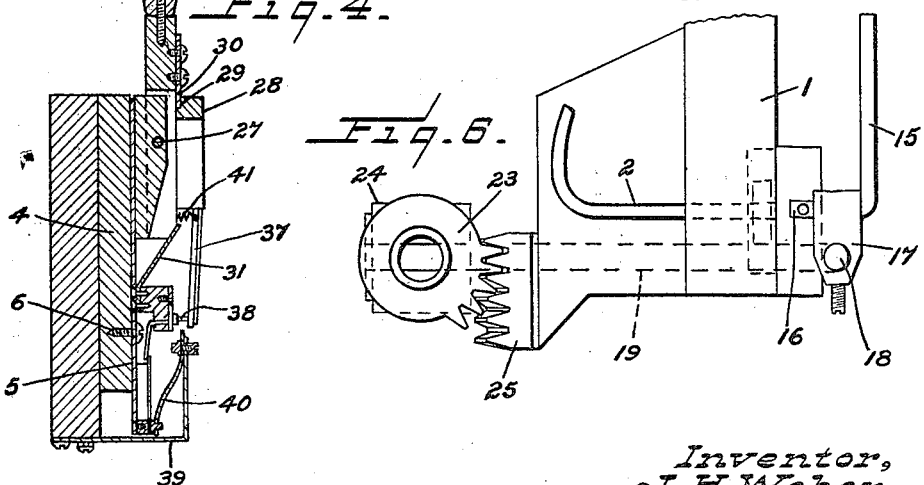
Inventor,
J. H. Weber.
By Fetherstonhaugh & Co.
Attys.

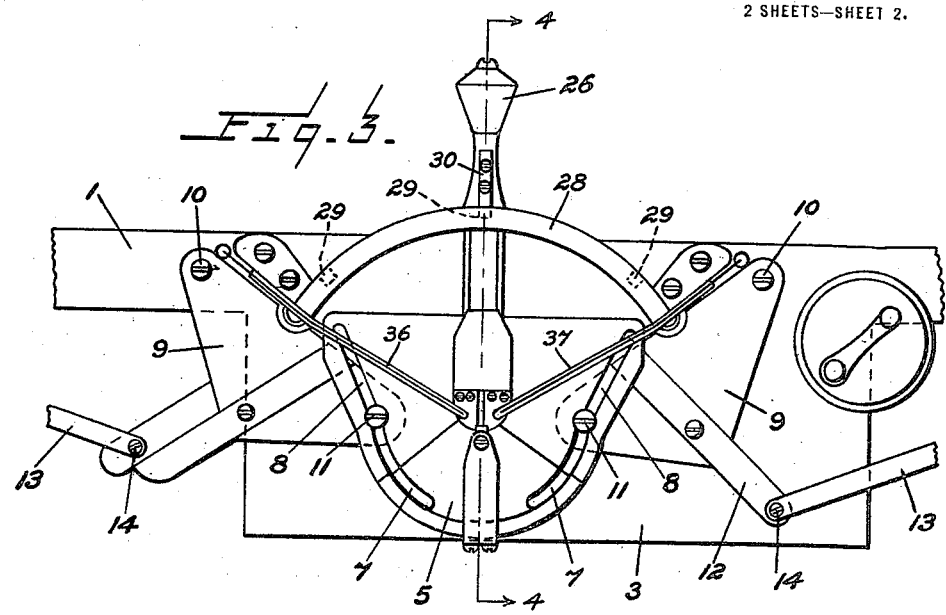
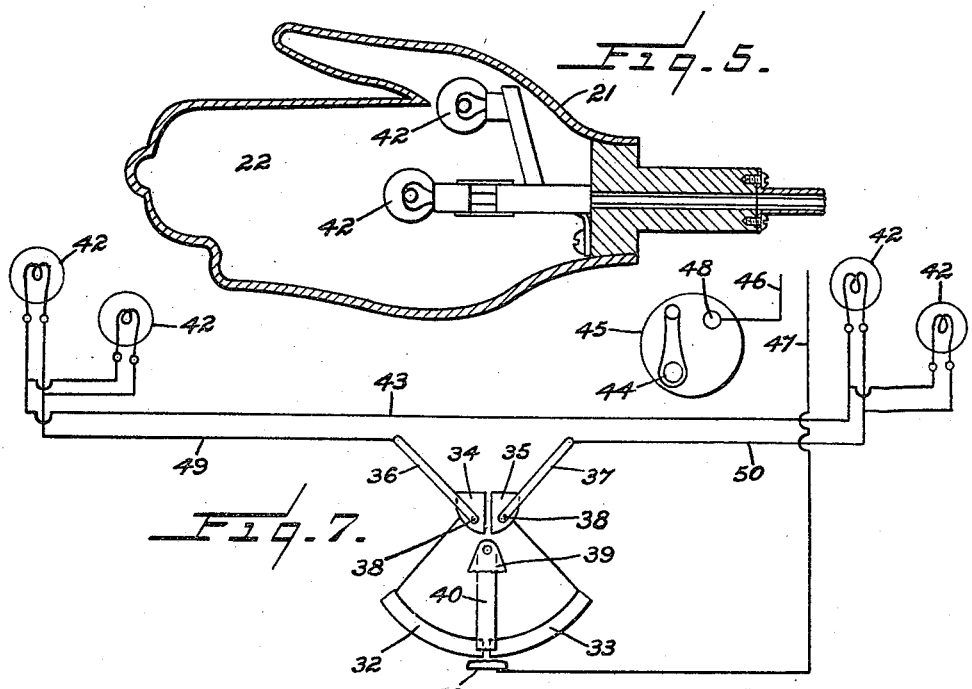

Patented Oct. 17, 1922.

1,432,000

UNITED STATES PATENT OFFICE.

JOSIAH HISTAND WEBER, OF KITCHENER, ONTARIO, CANADA.

AUTOMOBILE DIRECTION INDICATOR.

Application filed October 24, 1921. Serial No. 509,996.

*To all whom it may concern:*

Be it known that I, JOSIAH HISTAND WEBER, a resident of the city of Kitchener, in the county of Waterloo, in the Province of Ontario, Canada, have invented certain new and useful Improvements in Automobile Direction Indicators, of which the following is the specification.

My invention relates to improvements in automobile direction indicators and the object of the invention is to devise a direction indicator preferably applicable to the dash of the motor car whereby the direction signals can be observed from both the front and rear of the car. A further object is to devise means whereby the direction signals can be swung into the inoperative position when not required, and in which either direction signal may be swung down into the operative position by the driver of the car. A still further object is to provide means for illuminating the signals at night.

My invention consists of an automobile direction indicator constructed and arranged substantially as hereinafter more particularly described and illustrated in the accompanying drawing in which—

Fig. 1 represents a rear elevation of the device showing the same applied to the dash of the automobile with a control lever within reach of the driver of the car. In this view both signals are shown in the upright or straightaway position.

Fig. 2 is a similar elevation of a portion of the device showing the left hand signal in the operative position.

Fig. 3 is an enlarged rear elevation of the means for actuating the direction signals.

Fig. 4 is a cross sectional view through the line 4—4 Figure 3.

Fig. 5 is an enlarged vertical section through one of the direction signals showing the means for illuminating the same.

Fig. 6 is an enlarged detail in plan showing the gearing for actuating the direction signals, and Fig. 7 is a diagrammatic view of the electrical connections.

Like characters of reference indicate corresponding parts in the different views.

1 is a member extending across the dash of the car and provided with the hooks 2 by means of which the member is secured to the wind shield or to the dash. 3 is a depending portion formed on the member 1. 4 is a raised portion secured thereto, 5 is a cam plate rotatably secured to the portion 4 by the pin 6, said cam plate having the opposed arc shaped slots 7 therein, said slots communicating with the opposed inclined straight slots 8.

9 are opposed swingable links pivotally mounted on the member 1 by means of the pins 10, said links provided with the pins 11 inserted into the opposed slots 7 and 8. 12 are levers suitably secured to the links 9, and 13 are laterally extending rods pivotally connected at their inner ends to such levers by means of the pins 14. 15 are threaded spindles threaded into the outer ends of the rods 13 and provided with offset ends 16 adapted to be pivotally connected to socket members 17.

The socket members 17 are suitably secured to the offset rear ends 18 of the spindles 19, said spindles being suitably journalled in the ends of the member 1. The forward end of each spindle being connected to an indicating signal arm 20 carrying the indicating signal 21 such as the hand illustrated in Figures 1, 2 and 5. The said hands are provided with translucent backs, fronts and forward edges 22, 122 and 123 respectively.

When in the straightaway position the signals 21 are situated in the position shown in Figure 1 of the drawings wherein the translucent edge of the signal is to the front.

23 are quadrant gears on the signal arms 20, said signal arms being rotatable in sockets 24 which are secured to the spindles 19, 25 are toothed racks secured to the forward face of the member 1 and adapted to mesh with the quadrant gears 23 on the signal arms.

26 is an operating lever hinged intermediately of its length to the cam plate 5 by the pin 27. 28 is a notched quadrant plate situated in the vicinity of the lever and provided with the notches 29 into which the dog 30 on the lever is adapted to be inserted when the lever is swung into the different positions. 31 is a leaf spring engaging the lower end of the lever and adapted to hold the dog 30 in engagement with the notched face of the quadrant plate. 32 and 33 are independent segments of a contact plate, said segments being insulated one from the other and from the cam plate 5 to which they are suitably secured, said contact plate being mounted in the vicinity of the bottom of such cam plate. 34 and 35 are the independent segments of a semicircular contact plate, said segments being insulated one from the other and from the cam plate to which they are secured in the vicinity of the centre thereof.

36 and 37 are brushes pivotally connected to the quadrant plate 28 and provided with contacts 38 on their free ends engaging the respective segments 34 and 35.

39 is a bracket secured to the lower face of the portion 3 and bent upwardly over the lower contact plate, said bracket 39 provided with a downwardly extending brush 40 adapted to engage the respective segments 32 and 33 of such lower contact plate. 41 are springs, each connected at one end to the brushes 36 and 37 and at the other end to the portion 3 for normally holding the contacts 38 on the brushes 36 and 37 in engagement with the contact segments 34 and 35.

42 are lamps situated in the hands 21, such lamps being connected in parallel. 43 is one of the lead wires from the lamps, leading to one terminal 44 of a switch 45. 46 and 47 are the wires leading to the terminals of the storage battery in the car, the wire 46 being connected to the other terminal 48 of the switch 45. The wire 47 extends downwardly and is connected to the bracket 39 to which is connected the brush 40. In the diagrammatic view shown in Figure 7 it will be seen that the bracket 39 is broken away to expose the brush 40. The other lead wires 49 and 50 from the lamps are connected respectively to the contacts 38 on the brushes 36 and 37.

The operation of my device is as follows:

When the driver desires to indicate that he is about to turn to the left he swings the lever 26 to the left as is shown in Figure 2. When this is done the cam plate which is attached to such lever is turned so that through the medium of the pin 11 which runs in the slots 7 and 8, the left hand swingable link 9 is turned outwardly about its pivot. This forces the left hand rod 13 outwardly and as such rod is connected to the offset end of the spindle 19 such spindle is rotated a certain extent. This spindle swings down the arm 20 and attached hand 21 into the operative position shown in Figure 2. As the arm 20 is rotatably mounted it will be seen that as it is swung down the quadrant gear 23, meshing with the rack 25 will turn such arm and hand into the operative position.

Owing to the construction of the slots 7 which are curved on a radius taken from the centre of the pivot point of the cam plate, it will be seen that during this operation the right hand arm and hand will not be moved.

Should it be desired to indicate that the vehicle is about to be turned to the right it is merely necessary to swing the lever to the right when the right hand arm and attached signal will be thrown down into the operative position in exactly the same manner as above described, the other signal lever and arm in this instance remaining in the straightaway position shown in Figure 1.

To restore either arm to the straightaway position it is only necessary to swing the lever 26 into the vertical position wherein both arms and attached signals will be in the upright or straightaway position.

When the device is used at night the respective pairs of lights 42 in the hands will be thrown into circuit when the corresponding signal is thrown into the operative position. By referring to the diagrammatic view in Figure 7 it will be seen that when for instance the lever 26 is thrown to the left the brush 40 will make contact with the left hand segment 32 of the lower contact plate, and as the brush 36 is always in contact with the left hand segment 34 the circuit will be completed in so far as the left hand lamps 42 are concerned, provided of course the switch 45 is closed, and thus the left hand lights 42 will be lighted.

When the lever 26 is swung to the right the brush 40 will contact with the right hand segment 33 and as the brush 37 is in permanent contact with the segment 35 the circuit for the right hand lamps will be closed.

When the lever 26 is in the position shown in Figures 1 and 3 the brush 40 will be in contact with both segments 32 and 33 and thus both light circuits will be closed, thus reflecting the light through the translucent forward edges of the signals.

When the direction indicator is being actuated during the day the switch 45 is left open in order that the lights will not be on.

Owing to the front, back and forward edges of the hands 22 being translucent, when the lights 42 in the hands are lit up the signal will be clearly seen at night from both the front and rear when in the out position, and from the front only when in the straightaway or up position.

Although I have described my signals as consisting of hands it is to be understood that they could with equal facility be constructed to represent arrows or other suitable warning signals. Although I have shown the mechanism for operating the warning signals as applied to the dash of the vehicle it could, by making certain modifications, be applied to the steering column.

What I claim as my invention is:

1. In an automobile direction indicator, signals on each side of the vehicle, supporting means therefor, spindles extending through the said supporting means and having offset rear ends constituting levers, sockets secured to the forward ends of the spindles, signal arms rotatably secured in said sockets, indicating signals on the free ends of the said arms, means connected to the levers for partially rotating the spindles independently and swinging the signals down into the lateral direction indicating position, and coacting means between the arms and the supporting means for rotating the former upon the signals being swung down.

2. In an automobile direction indicator, signals on each side of the vehicle, supporting means therefor, spindles extending through the said supporting means and having offset rear ends constituting levers, sockets secured to the forward ends of the spindles, signal arms rotatably secured in said sockets, indicating signals on the free ends of the said arms, quadrant gears on the arms, toothed racks secured to the supporting means and meshing with the gears and means connected to the levers for partially rotating the spindles independently and swinging the signals down into the lateral direction indicating position.

3. In an automobile direction indicator, laterally swingable signals mounted on each side of the vehicle, an operating lever, a suitably pivoted cam plate connected to the operating lever, coacting means between the cam plate and the opposed links for independently actuating the respective swingable links upon the cam plate being swung in the required direction, and means connected to each signal and link for actuating the former into the lateral direction indicating position upon the operating lever being moved into the required position.

4. In an automobile direction indicator, laterally swingable signals mounted on each side of the vehicle, an operating lever, a suitably pivoted cam plate connected to the operating lever, said cam plate having opposed curved slots therein each communicating with an inclined upper slot, opposed swingable links, pins on said links inserted in the opposed slots, and means connected to each signal and link for actuating the former into the lateral direction indicating position upon the operating lever being moved into the required position.

5. In an automobile direction indicator, laterally swingable signals mounted on each side of the vehicle, an operating lever, a suitably pivoted cam plate connected to the operating lever, said cam plate having opposed curved slots therein each communicating with an inclined upper slot, opposed swingable links, pins on said links inserted in the opposed slots, means connected to each signal and link for actuating the former into the operative position upon the operating lever being moved into the required position, a quadrant plate having notches, a dog on the operating lever adapted to engage said notches, said lever being hinged intermediately and spring-held in engagement with the quadrant plate.

JOSIAH HISTAND WEBER.